(12) United States Patent
Takama

(10) Patent No.: US 9,052,514 B2
(45) Date of Patent: Jun. 9, 2015

(54) LIQUID-CRYSTAL LENS, DISPLAY APPARATUS AND ELECTRONIC EQUIPMENT

(71) Applicant: Japan Display Inc., Tokyo (JP)

(72) Inventor: Daisuke Takama, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 30 days.

(21) Appl. No.: 13/754,447

(22) Filed: Jan. 30, 2013

(65) Prior Publication Data

US 2013/0235288 A1 Sep. 12, 2013

(30) Foreign Application Priority Data

Mar. 8, 2012 (JP) ................................ 2012-051828

(51) Int. Cl.
*G02F 1/133* (2006.01)
*G02B 27/22* (2006.01)
*G02B 3/12* (2006.01)
*G02F 1/1343* (2006.01)
*G02F 1/29* (2006.01)

(52) U.S. Cl.
CPC .............. *G02B 27/2214* (2013.01); *G02B 3/12* (2013.01); *G02F 1/1343* (2013.01); *G02F 1/29* (2013.01); *G02F 2001/294* (2013.01)

(58) Field of Classification Search
CPC ................................................... G02B 27/2214
See application file for complete search history.

(56) References Cited

U.S. PATENT DOCUMENTS

| | | | |
|---|---|---|---|
| 2009/0015739 A1* | 1/2009 | Shin et al. | 349/15 |
| 2011/0228181 A1* | 9/2011 | Jeong et al. | 349/15 |
| 2012/0162592 A1* | 6/2012 | Takagi et al. | 349/139 |

FOREIGN PATENT DOCUMENTS

| | | |
|---|---|---|
| JP | 2009-053345 | 3/2009 |
| JP | 2011-150344 | 8/2011 |
| JP | 2011-164527 | 8/2011 |

* cited by examiner

*Primary Examiner* — Timothy L Rude
(74) *Attorney, Agent, or Firm* — K&L Gates LLP

(57) ABSTRACT

Disclosed herein is a liquid-crystal lens including: a plurality of first electrodes; a second electrode placed to be opposed to the first electrodes; and a liquid-crystal layer provided between the first electrodes and the second electrode. The first electrodes each receiving a relatively low voltage applied thereto are provided more adjacently to each other than the first electrodes each receiving a relatively high voltage applied thereto.

8 Claims, 9 Drawing Sheets

LIQUID-CRYSTAL LENS, DISPLAY APPARATUS AND ELECTRONIC EQUIPMENT

CROSS REFERENCES TO RELATED APPLICATIONS

The present application claims priority to Japanese Priority Patent Application JP 2012-051828 filed in the Japan Patent Office on Mar. 8, 2012, the entire content of which is hereby incorporated by reference.

BACKGROUND

The present disclosure relates to a liquid-crystal lens, display apparatus and electronic equipment.

If a voltage is applied between electrodes, which are opposed to each other to sandwich a liquid-crystal layer, in order to control an electric-field distribution in the liquid-crystal layer, liquid-crystal molecules included in the liquid-crystal layer are oriented in accordance with the electric-field distribution. The liquid-crystal molecules have refractive-index anisotropy. Thus, when the orientation state changes, the refractive index for light incident to the liquid-crystal layer also changes as well. Utilizing such a phenomenon, the electric-field distribution applied to the liquid-crystal layer is controlled by controlling the voltage applied between the electrodes in order to produce a refractive-index distribution exhibiting a lens effect. Thus, by controlling the voltage applied between the electrodes, the electrodes and the liquid-crystal layer can be used as a liquid-crystal lens.

For example, Japanese Patent Laid-open No. 2009-53345 discloses a three-dimensional display apparatus having a liquid-crystal lens making use of two lower electrodes for every lens. In order to implement a good liquid-crystal lens, the electric-field distribution applied to the liquid crystal needs to be controlled with a high degree of precision. For this reason, Japanese Patent Laid-open No. 2011-150344 and Japanese Patent Laid-open No. 2011-164527 disclose a liquid-crystal lens in which a number of lower electrodes are provided for every lens by being separated from each other by an equal pitch.

SUMMARY

If the number of electrodes is small, however, it is difficult to control the electric-field distribution with a high degree of precision. If the number of electrodes is large, on the other hand, the size of an integrated circuit adapted to control the electrodes increases undesirably. In addition, if the distance between electrodes is short due to an increased electrode count representing the number of electrodes, the yield decreases inevitably because of a pattern defect.

In order to solve the problems described above, it is desirable to control the electric-field distribution applied to the liquid crystal with a high degree of precision by making use of few electrodes.

In accordance with an embodiment of the present disclosure, there is provided a liquid-crystal lens including: a plurality of first electrodes; a second electrode placed to be opposed to the first electrodes; and a liquid-crystal layer provided between the first electrodes and the second electrode. In the liquid-crystal lens, the first electrodes each receiving a relatively low voltage applied thereto are provided more adjacently to each other than the first electrodes each receiving a relatively high voltage applied thereto.

In accordance with another embodiment of the present disclosure, there is provided a display apparatus including: a display section configured to display an image; and a liquid-crystal lens placed to be opposed to the display section and used to receive incident image light of the image to be displayed on the display section. The liquid-crystal lens has: a plurality of first electrodes; a second electrode placed to be opposed to the first electrodes; and a liquid-crystal layer provided between the first electrodes and the second electrode. In the liquid-crystal lens, the first electrodes each receiving a relatively low voltage applied thereto are provided more adjacently to each other than the first electrodes each receiving a relatively high voltage applied thereto.

In accordance with a further embodiment of the present disclosure, there is provided electronic equipment including a display apparatus having: a display section configured to display an image; and a liquid-crystal lens placed to be opposed to the display section and used to receive incident image light of the image to be displayed on the display section. The liquid-crystal lens has: a plurality of first electrodes; a second electrode placed to be opposed to the first electrodes; and a liquid-crystal layer provided between the first electrodes and the second electrode. In the liquid-crystal lens, the first electrodes each receiving a relatively low voltage applied thereto are provided more adjacently to each other than the first electrodes each receiving a relatively high voltage applied thereto.

As described above, in accordance with the embodiments of the present disclosure, it is possible to control the electric-field distribution applied to the liquid crystal with a high degree of precision by making use of few electrodes.

Additional features and advantages are described herein, and will be apparent from the following Detailed Description and the figures.

DETAILED DESCRIPTION

Figure 1:
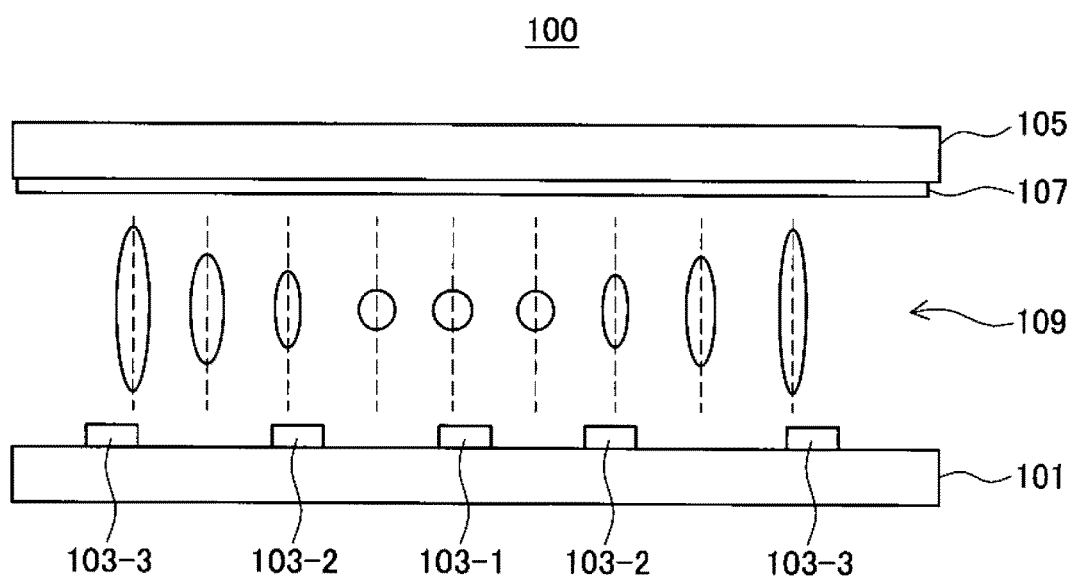
FIG. 1 is an explanatory diagram showing a configuration of a liquid-crystal lens according to a first embodiment of the present disclosure.

Preferred embodiments of the present disclosure are explained in detail by referring to the diagrams as follows. It is to be noted that, in this specification and the diagrams explained briefly above, configuration elements having essentially identical functional configurations are denoted by the same reference numeral in order to avoid duplications of explanations of the configuration elements.

It is also to be noted that the description is divided into topics arranged in the following order.
1: First Embodiment
2: Second Embodiment (Example having non-uniform electrode widths)
3: Typical Applications

1: First Embodiment (1-1: Typical Configuration)

Figure 10:
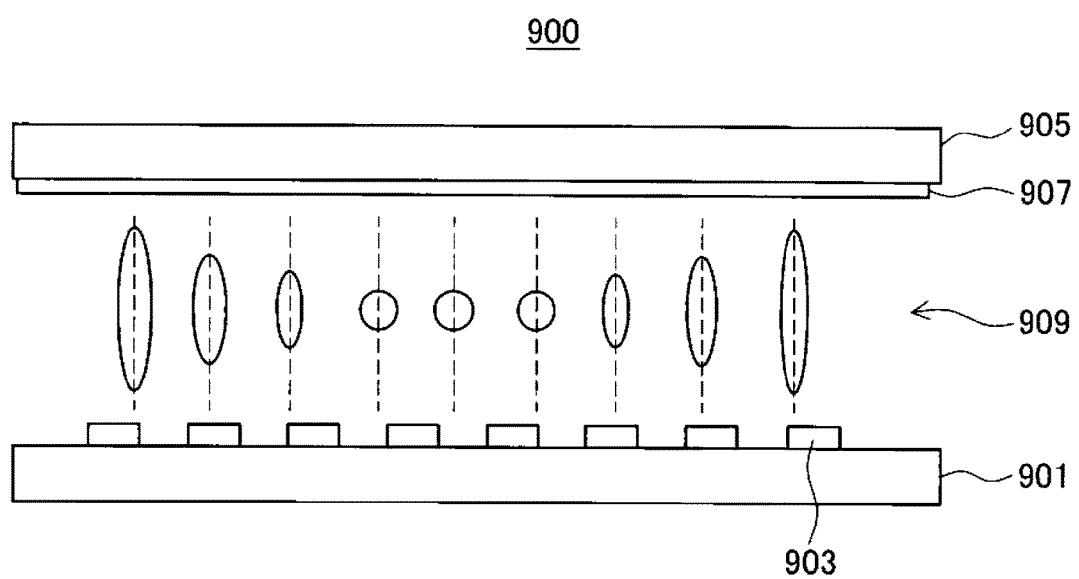
FIG. 10 is an explanatory diagram showing a liquid-crystal lens having a configuration including electrodes provided at equal pitches to serve as a typical comparison lens to be compared with the first embodiment.

A configuration of a liquid-crystal lens according to a first embodiment of the present disclosure is explained by referring to FIGS. 1 and 10 as follows. FIG. 1 is an explanatory diagram showing the configuration of the liquid-crystal lens according to the first embodiment of the present disclosure. FIG. 10 is an explanatory diagram showing a liquid-crystal lens having a configuration including electrodes provided at equal pitches to serve as a typical comparison lens to be compared with the liquid-crystal lens according to the first embodiment.

As shown in FIG. 1, a liquid-crystal lens 100 according to the first embodiment of the present disclosure includes a first substrate 101, a plurality of first electrodes 103, a second substrate 105, a second electrode 107 and a liquid-crystal layer 109.

The first substrate 101 and the second substrate 105 are each made of a material transparent for visible light. For example, the first substrate 101 and the second substrate 105 can each be made of a glass material. The first electrodes 103 are formed on the first substrate 101. The first electrodes 103 are provided at intervals and separated from each other by gaps. The second electrode 107 is formed on the second substrate 105 all but uniformly over the entire surface of the second substrate 105. The first electrodes 103 and the second electrode 107 are each a conductive film transparent for visible light. A typical example of the conductive film transparent for visible light is an ITO (Indium Tin Oxide) film.

The liquid-crystal layer 109 is formed between the array of the first electrodes 103 and the second electrode 107. The liquid-crystal layer 109 includes liquid-crystal molecules having refractive-index anisotropy. For example, a liquid-crystal molecule exhibits different refractive indexes for incident light propagating in a longitudinal direction and incident light propagating in a lateral direction. The orientation of the liquid-crystal molecule is changed in accordance with an electric-field distribution generated by a voltage applied between the first electrodes 103 and the second electrode 107. Thus, the refractive index seen from the liquid-crystal layer 109 as the refractive index for incident light changes. Accordingly, the liquid-crystal layer 109 can form a refractive-index distribution in accordance with the electric-field distribution between the first electrodes 103 and the second electrode 107, exhibiting a lens effect.

First electrodes 103 each receiving a relatively low voltage applied thereto are provided more adjacently to each other than first electrodes 103 each receiving a relatively high voltage applied thereto. That is to say, the first electrodes 103 each receiving a relatively low voltage applied thereto have electrode pitches smaller than the first electrodes 103 each receiving a relatively high voltage applied thereto. In the typical configuration shown in FIG. 1, the closer the first electrode 103 to the center of the lens, the lower the voltage applied to the first electrode 103. Thus, the first electrodes 103 close to the center of the lens are provided at small electrode pitches. FIG. 1 shows a typical configuration in which an independent-electrode count representing the number of independent electrodes is three. To be more specific, the second electrode 107 and a first electrode 103-1 are set at the same electric potential. The same voltage is applied to two first electrodes 103-2, and another same voltage is applied to two first electrodes 103-3. In this case, by properly controlling the voltages applied to the first electrodes 103, it is possible to control the electric-field distribution existing between the first electrodes 103 and the second electrode 107.

In the liquid-crystal lens 100 according to this embodiment, the electrode pitch at which the first electrodes 103 are provided varies. As described above, the first electrodes 103 each receiving a relatively low voltage applied thereto have electrode pitches smaller than the first electrodes 103 each receiving a relatively high voltage applied thereto. In the typical configuration shown in FIG. 1, the distance between the first electrode 103-1 and the first electrodes 103-2 is shorter than the distance between the first electrodes 103-2 and the first electrodes 103-3. By providing the first electrodes 103 in this way, it is possible to control the electric-field distribution in the liquid-crystal layer 109 with a high degree of precision by making use of only few electrodes and, thus, control the orientations of the liquid-crystal molecules with a high degree of precision.

As a method adapted to control the electric-field distribution with a high degree of precision, a technique of increasing the number of electrodes is conceivable. For example, FIG. 10 shows a liquid-crystal lens 900 as a typical comparison lens to be compared with the liquid-crystal lens 100 according to the first embodiment. As shown in the figure, the liquid-crystal lens 900 includes a first substrate 901, a plurality of first electrodes 903, a second substrate 905, a second electrode 907 and a liquid-crystal layer 909. In this configuration, the first electrodes 903 are provided at equal intervals. By increasing the number of electrodes in a lens in this way, it is possible to control an electric-field distribution in the liquid-crystal layer 909 with a high degree of precision. If the number of electrodes in a lens is raised, however, the size of an IC used to control the electric-field distribution also increases inevitably as well. In addition, if the number of electrodes in a lens is raised, the gap between the electrodes becomes narrow so that it is quite within the bounds of possibility that the yield decreases inevitably because of a pattern defect. In order to solve these problems, as proposed by the embodiments of this disclosure, there is provided a liquid-crystal lens capable of exhibiting a precise lens effect by making use of only few electrodes.

(1-2: Lens Performance)

Figure 2:
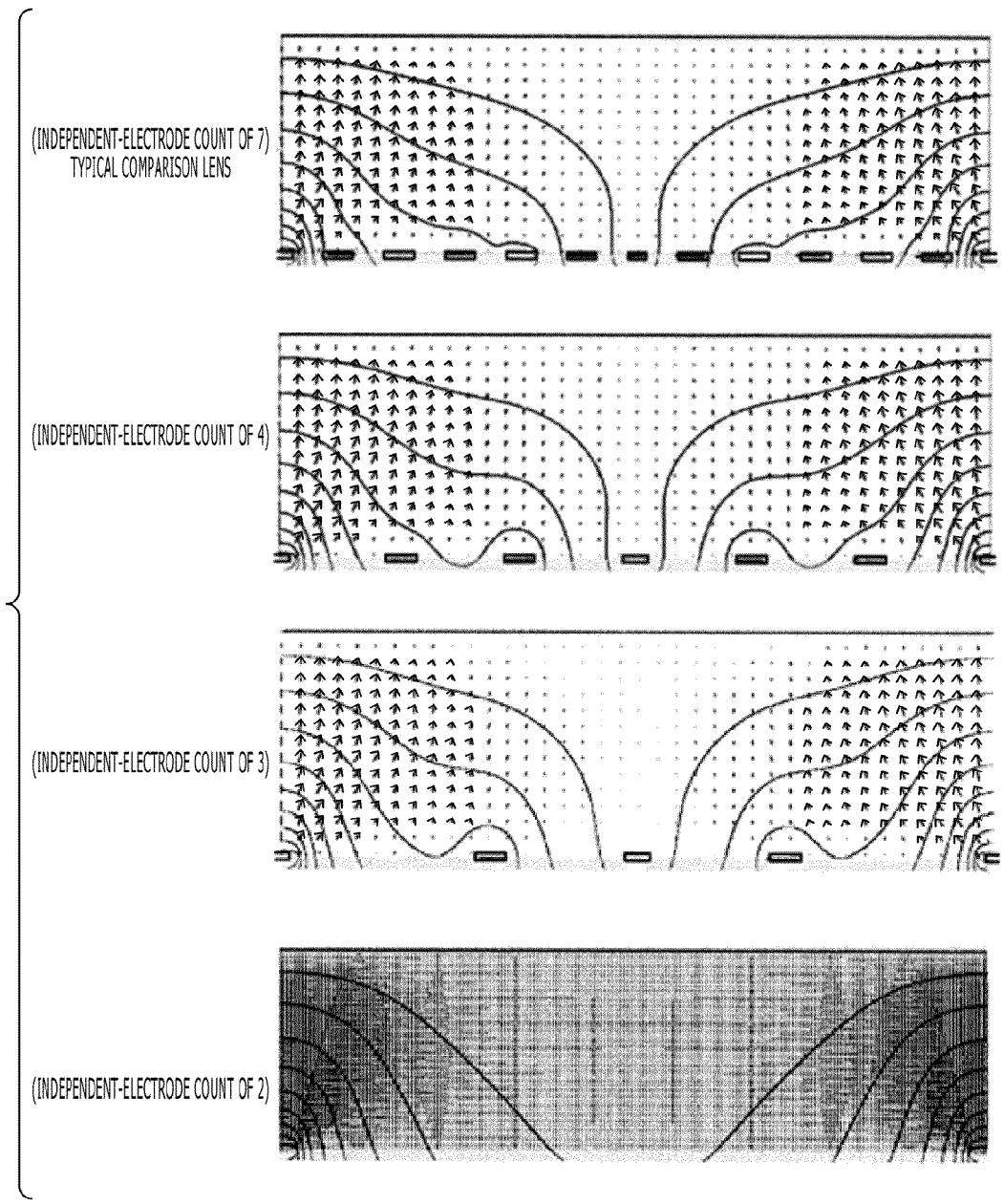
FIG. 2 is an explanatory diagram showing electric-field distributions of the liquid-crystal lens according to the same embodiment.
Figure 3:
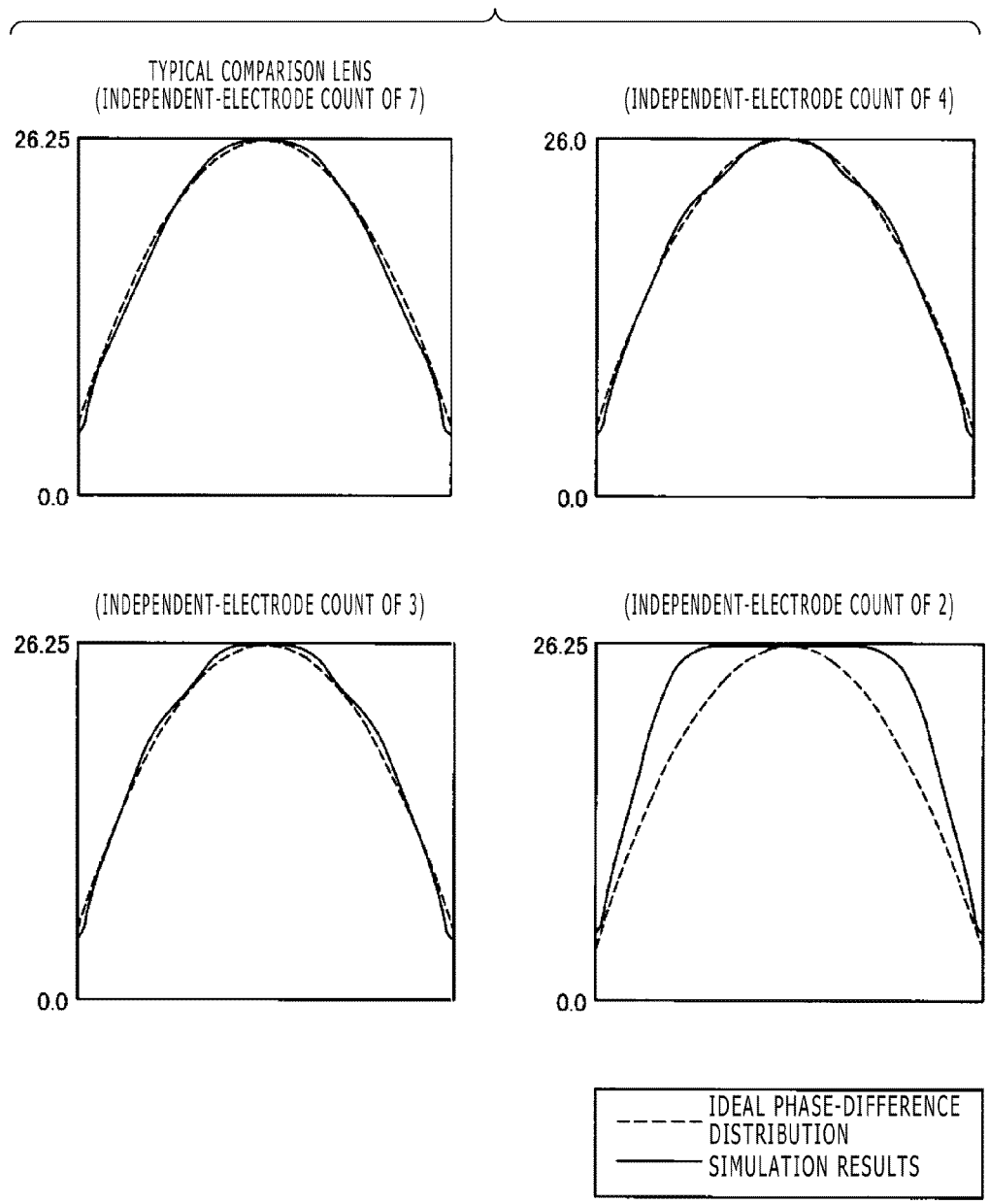
FIG. 3 is an explanatory diagram to be referred to in comparing phase-difference distributions of the liquid-crystal lens according to the same embodiment with an ideal phase-difference distribution.

By referring to FIGS. 2 and 3, the following description explains a lens performance for a case in which the gap between the first electrodes 103 is made non-uniform to change the number of independent electrodes. FIG. 2 is an explanatory diagram showing electric-field distributions of the liquid-crystal lens according to the first embodiment whereas FIG. 3 is an explanatory diagram to be referred to in comparing phase-difference distributions of the liquid-crystal lens according to the first embodiment with an ideal phase-difference distribution.

FIG. 2 shows electric-field distributions of the liquid-crystal lens 100 for independent-electrode counts of seven, four, three and two. A horizontal direction of FIG. 2 represents the diameter of the lens, the positions of the electrodes and equipotential surfaces. In addition, arrows in the liquid-crystal layer 109 shown in FIG. 2 each indicate the orientation direction of the liquid crystal. It is to be noted that, in the typical configuration in which the independent-electrode count is set at seven, the first electrodes 103 are provided at equal intervals. In addition, FIG. 3 shows phase-difference distributions for the typical configurations shown in FIG. 2. As shown in FIGS. 2 and 3, in the case of the configuration having the independent-electrode count of seven, it is possible to obtain a phase-difference distribution very close to an ideal phase-difference distribution to obtain a desired optical characteristic. In addition, even for the independent-electrode counts of three and four, by providing a configuration in which, the closer the first electrodes 103 to the center of the liquid-crystal lens 100, the smaller the gap between the first electrodes 103, it is possible to hold the state of the phase-difference distribution very close to the ideal phase-difference distribution to obtain the desired optical characteristic.

2: Second Embodiment (2-1: Typical Configuration)

Figure 4:
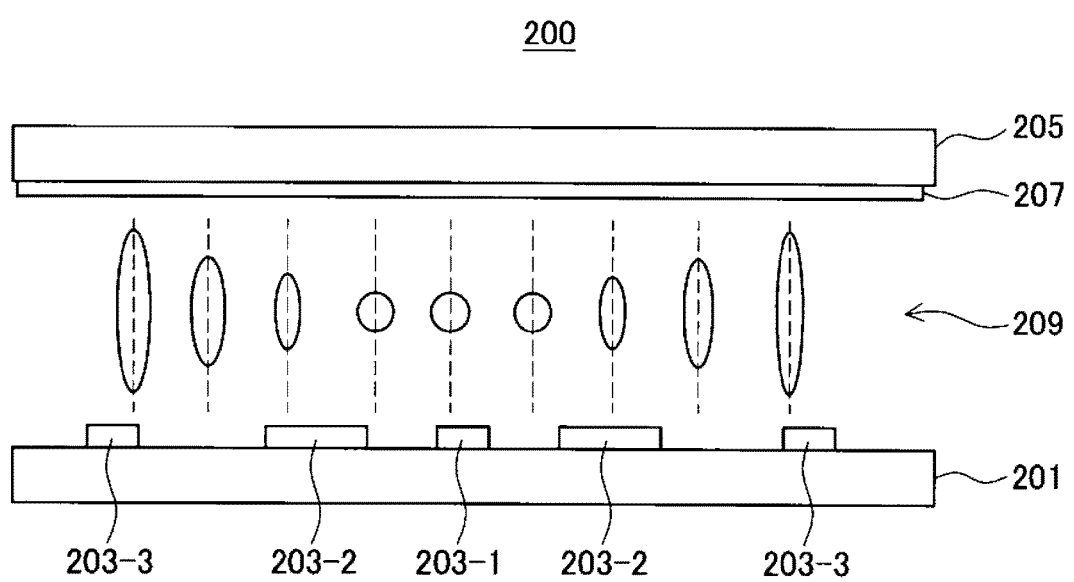
FIG. 4 is an explanatory diagram showing a configuration of a liquid-crystal lens according to a second embodiment of the present disclosure.

By referring to FIG. 4, the following description explains a configuration of a liquid-crystal lens according to a second embodiment of the present disclosure. FIG. 4 is an explanatory diagram showing the configuration of the liquid-crystal lens according to the second embodiment of the present disclosure.

As shown in the figure, a liquid-crystal lens 200 includes a first substrate 201, a plurality of first electrodes 203, a second substrate 205, a second electrode 207 and a liquid-crystal layer 209. The layout of the first electrodes 203 in the liquid-crystal lens 200 is different from the layout of the first electrodes 103 in the liquid-crystal lens 100. The following description explains differences between the liquid-crystal lens 200 and the liquid-crystal lens 100 whereas the explanation of sections common to the liquid-crystal lens 200 and the liquid-crystal lens 100 is omitted.

The first electrodes 203 of the liquid-crystal lens 200 are provided, being separated from each other by gaps. The first electrodes 203 each receiving a relatively low voltage applied thereto have electrode pitches smaller than first electrodes 203 each receiving a relatively high voltage applied thereto. The widths of the first electrodes 203 are not uniform. For example, first electrodes 203-2 may be formed to have a width greater than the widths of a first electrode 203-1 and first electrodes 203-3.

(2-2: Lens Performance)

Figure 5:
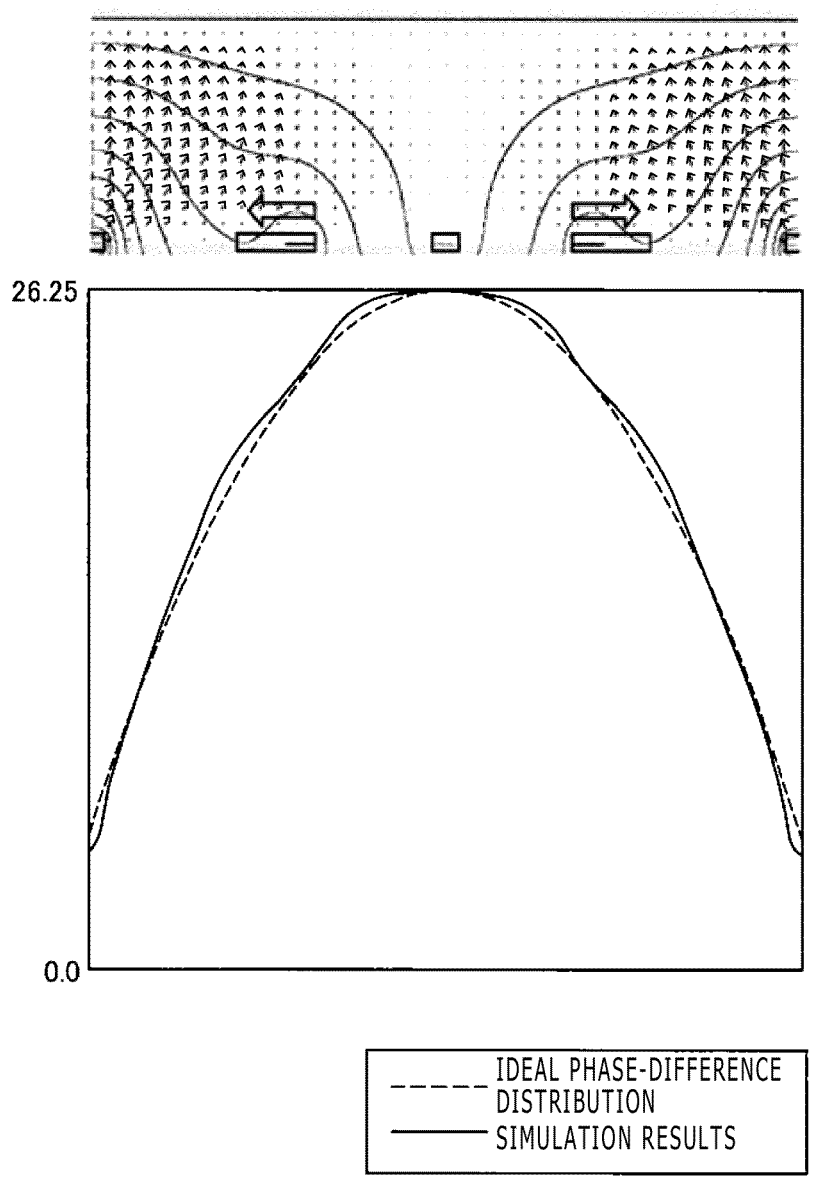
FIG. 5 is an explanatory diagram showing an electric-field distribution and a phase-difference distribution for the liquid-crystal lens according to the second embodiment.

Next, by referring to FIG. 5, the following description explains the lens performance of the liquid-crystal lens 200 according to the second embodiment of the present disclosure. FIG. 5 is an explanatory diagram showing an electric-field distribution and a phase-difference distribution for the liquid-crystal lens 200 according to the second embodiment.

FIG. 5 shows an electric-field distribution and a phase-difference distribution for the liquid-crystal lens 200 having an independent-electrode count of three. As explained before, the liquid-crystal lens 200 is a typical liquid-crystal lens with non-uniform lens widths. The liquid-crystal lens 200 has a pair of electrodes which are placed respectively between the diametrical center of the lens and two edges of the lens. The pitches of the electrodes are non-uniform. The widths of the electrodes are also non-uniform. The lower portion of FIG. 5 shows comparison of the phase-difference distribution of the liquid-crystal lens 200 with the ideal phase-difference distribution. By comparing the comparison shown FIG. 5 with the corresponding comparison shown in FIG. 3, it can be understood that, even in the case of non-uniform electrode widths, it is possible to hold the state of the phase-difference distribution very close to the ideal phase-difference distribution to obtain the desired optical characteristic.

3: Typical Applications

Figure 6:
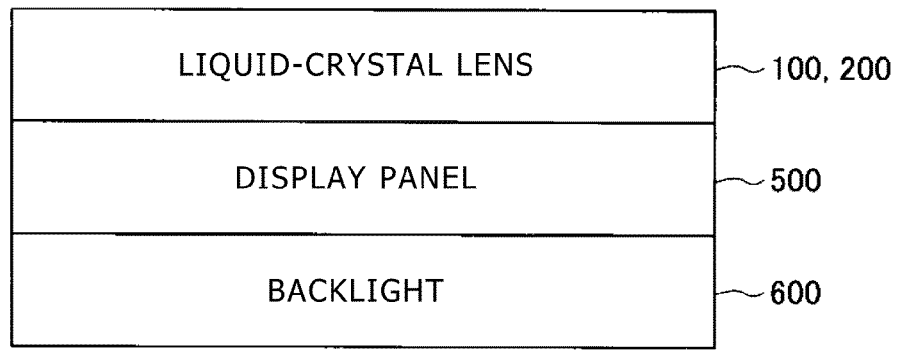
FIG. 6 is an explanatory diagram showing a typical cross-sectional configuration of a display apparatus making use of a liquid-crystal lens according to an embodiment of the present disclosure.
Figure 7:
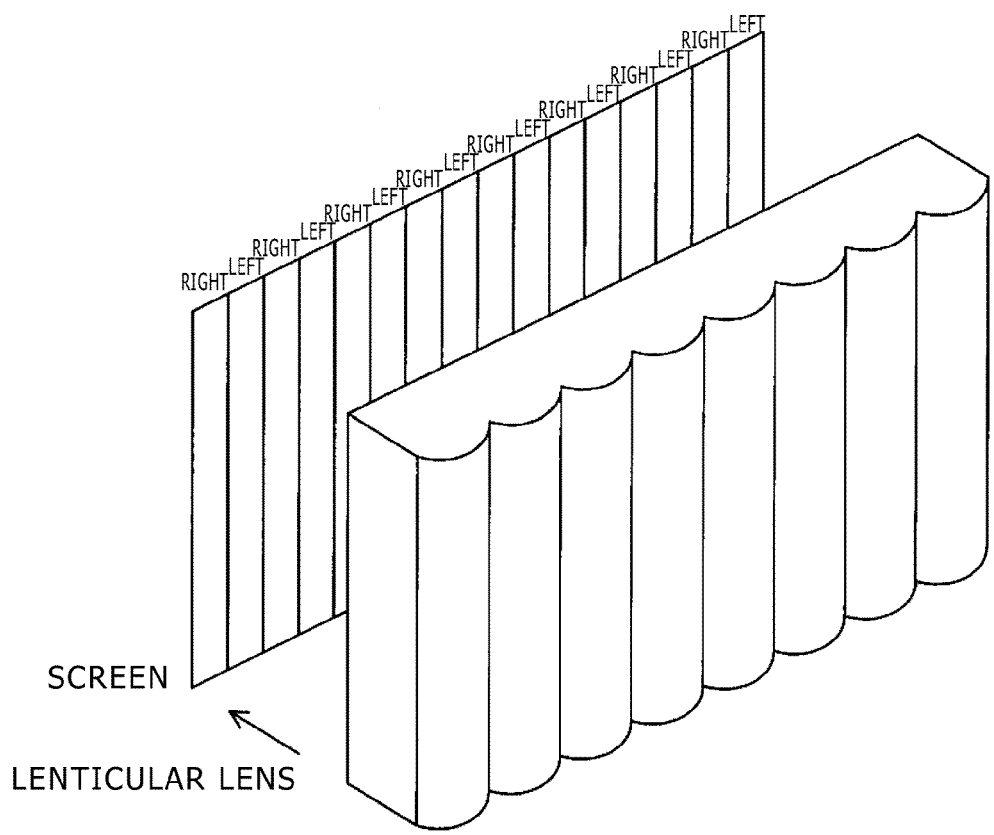
FIG. 7 is an explanatory diagram showing a typical external appearance of a lenticular lens and a typical screen configuration.
Figure 8:
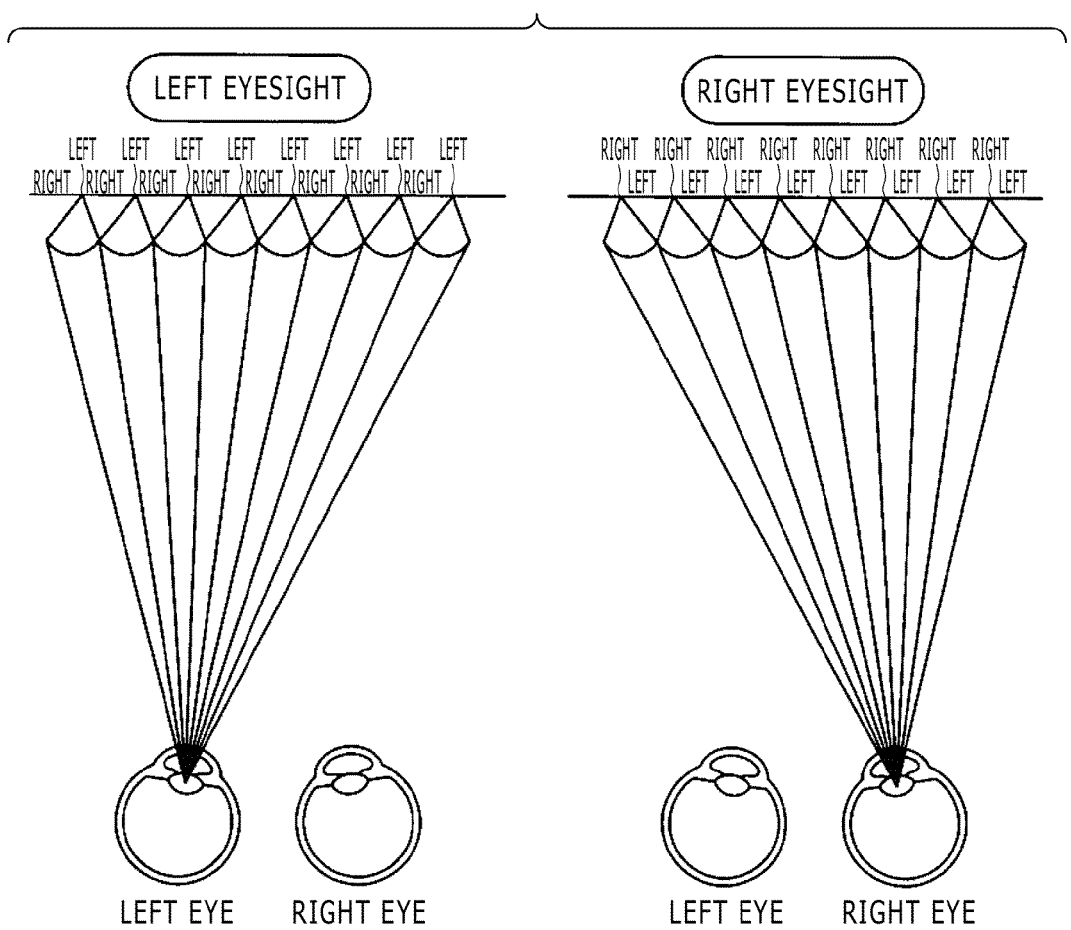
FIG. 8 is an explanatory diagram to be referred to in describing a principle of a lenticular lens.
Figure 9:
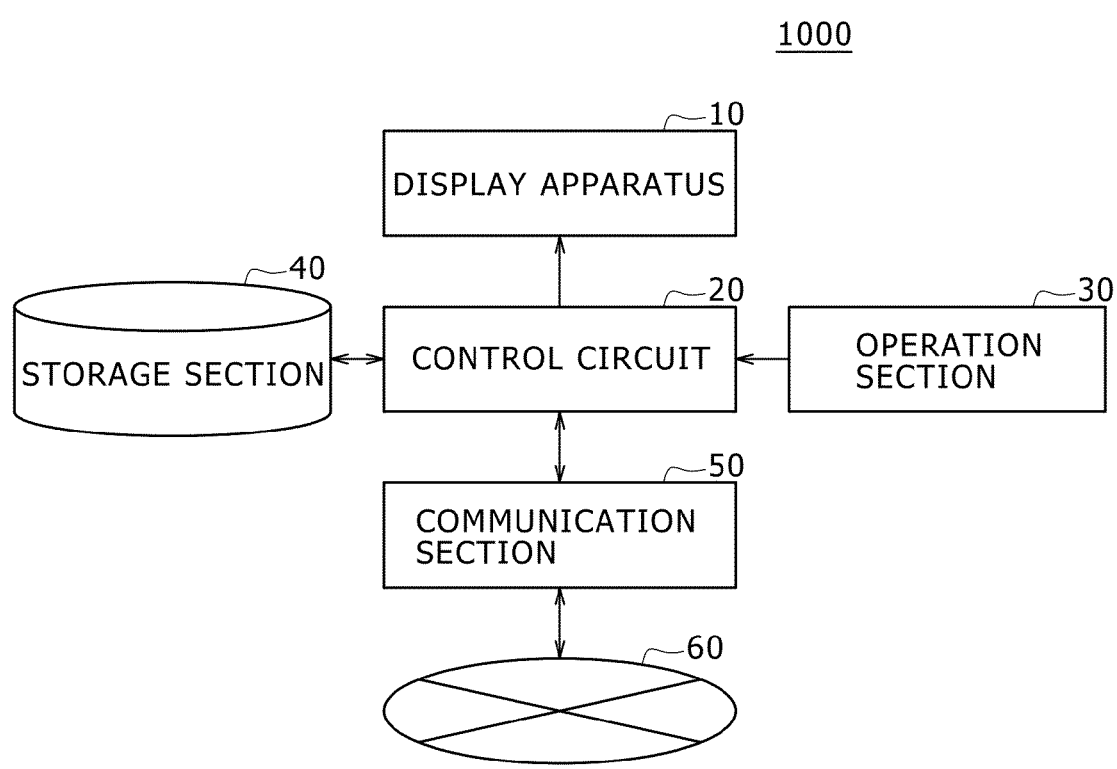
FIG. 9 is a block diagram showing a typical configuration of electronic equipment making use of a liquid-crystal lens according to an embodiment of the present disclosure.

The first and second embodiments each implementing a liquid-crystal lens according to the present disclosure have been explained so far. Next, by referring to FIGS. 6 to 9, the following description explains a typical configuration of a display apparatus making use of the liquid-crystal lens and a typical configuration of electronic equipment employing the display apparatus. FIG. 6 is an explanatory diagram showing a typical cross-sectional configuration of the display apparatus making use of the liquid-crystal lens according to an embodiment of the present disclosure whereas FIG. 7 is an explanatory diagram showing a typical external appearance of a lenticular lens and a typical screen configuration. FIG. 8 is an explanatory diagram to be referred to in explaining a principle of the lenticular lens whereas FIG. 9 is a block diagram showing a typical configuration of the electronic equipment making use of the liquid-crystal lens according to an embodiment of the present disclosure.

As shown in FIG. 6, a display apparatus 10 making use of the liquid-crystal lens 100 according to the first embodiment or the liquid-crystal lens 200 according to the second embodiment includes the liquid-crystal lens 100 or the liquid-crystal lens 200, a display panel 500 and a backlight 600. The backlight 600 is provided on the back surface of the display panel 500. The liquid-crystal lens 100 or the liquid-crystal lens 200 is provided on a side opposite to the backlight 600 with respect to the display panel 500.

As described above, the configuration of the display apparatus 10 includes the liquid-crystal lens 100 or the liquid-crystal lens 200, either of which is provided on the display panel 500 for displaying a disparity image. In this case, the liquid-crystal lens 100 or the liquid-crystal lens 200 is controlled to exhibit a lens effect equivalent to an effect provided by a lenticular lens. The lenticular lens is explained by referring to FIGS. 7 and 8 as follows.

As shown in FIG. 7, the lenticular lens is an array of half-cylindrical lenses. Behind the lenticular lens, a screen is provided for vertically displaying two images which have disparities between left and right eyes of an image observer. The two images are displayed for respectively two alternate lines. When the two images are observed by the image observer from a position separated away from the images by a specific distance, the image observer will recognize the two images as a three-dimensional image. The lenticular lens functions as a prism varying a position at which a visual line reaches the screen. The lenticular lens has each lens focusing on the screen, thereby functioning as convex lenses each used to enlarge an image of one line.

Accordingly, as shown in FIG. 8, the left eye is provided with enlarged images for the left eye by way of the lens entire area. The right eye is provided with enlarged images for the right eye by way of the lens entire area. Since there is a disparity between the images for the left eye and the images for the right eye, the image observer recognizes these images as a three-dimensional image.

The liquid-crystal lens 100 and the liquid-crystal lens 200 may exhibit the lens effect of such a lenticular lens. In this case, the liquid-crystal lens employed in the display apparatus 10 has the structure of the liquid-crystal lens 100 shown in FIG. 1 or the liquid-crystal lens 200 shown in FIG. 4 arranged repeatedly.

Next, by referring to FIG. 9, the following description explains a typical configuration of electronic equipment employing the display apparatus 10 described above. As shown in FIG. 9, electronic equipment 1000 includes the display apparatus 10, a control circuit 20, an operation section 30, a storage section 40 and a communication section 50. Typical examples of the electronic equipment 1000 are a television, a mobile phone (or a smart phone), a digital camera, a personal computer, navigation equipment and game equipment, to mention a few. Anyway, the electronic equipment 1000 is equipment making use of the liquid-crystal lens 100 or 200 in the display apparatus 10.

The control circuit 20 includes typically a CPU (Central Processing Unit), a RAM (Random Access Memory) and a ROM (Read Only Memory). The control circuit 20 controls the other sections employed in the electronic equipment 1000. Thus, the display apparatus 10 is also controlled by the control circuit 20.

The operation section 30 includes typically a touch pad, buttons, a keyboard and a mouse. The operation section 30 receives an operation input entered by a user. The control circuit 20 controls the electronic equipment 1000 in accordance with the operation input entered by the user by operating the operation section 30.

The storage section 40 is typically a semiconductor memory, a magnetic disk or an optical disk. The storage section 40 stores various kinds of data necessary to carry out functions of the electronic equipment 1000. The control circuit 20 may operate by reading out a program stored in the storage section 40 and executing the program.

The communication section 50 is an additional section provided for the electronic equipment 1000. The communication section 50 is a communication interface connected to a network 60 which is a wire or radio network. The communication section 50 is typically a modem, a port or an antenna. The control circuit 20 receives data from the network 60 by way of the communication section 50 and transmits data to the network 60 also by way of the communication section 50.

In addition to the liquid-crystal lens 100, the liquid-crystal lens 200 and the display apparatus 10, embodiments of the present disclosure also include the electronic equipment 1000.

The preferred embodiments of the present disclosure have been explained by referring to the accompanying diagrams so far. However, the scope of the present disclosure is by no means limited to these embodiments. It is obvious that a person having ordinary knowledge in the technical field of the present disclosure is capable of thinking of a variety of changes and a variety of modifications within the ranges of technological concepts described in the claims. It is a matter of course that such changes and modifications are also included in the technological range of the present disclosure.

It is to be noted that the diagrams and the descriptions are provided for mainly points required for understanding the technological contents of the present disclosure. Thus, the diagrams do not necessarily show all configurations. Configurations other than those shown in the diagrams may also be included. The thickness and the size for every configuration element shown in the diagrams are not always indicated at their correct proportions.

The embodiments described above implement a display apparatus making use of a liquid-crystal lens and implement electronic equipment employing the display apparatus. However, applications of the present application are by no means limited to the display apparatus and the electronic equipment. The technology can be applied to general liquid-crystal lenses which exhibit the lens effect when the orientation directions of the liquid-crystal molecules in the liquid-crystal lenses are changed. The display apparatus implemented by the embodiment making use of the liquid-crystal lens as described above is a three-dimensional display apparatus. However, applications of the present application are by no means limited to the three-dimensional display apparatus. The display apparatus making use of the liquid-crystal lens does not have to be a three-dimensional display apparatus. For example, the liquid-crystal lens according to the present application can be applied to a general display apparatus configured to split an image into images for a plurality of observing points and display the split images. The three-dimensional display apparatus displays two images for respectively the left and right eyes of an image observer so that the observer recognizes the two images as a three-dimensional image. However, the split images can also be presented to a plurality of image observers. In accordance with such a display apparatus, the image displayed to a plurality of image observers can be changed from observer to observer. For example, such a display apparatus can be applied to navigation equipment. In the navigation equipment, an image displayed to an image observer sitting on the driver seat can be made different from an image displayed to an image observer sitting on the front seat adjacent to the driver seat.

In the embodiments described above, a liquid-crystal material having a positive relative permittivity is used. However, the technological range of the present disclosure is by no means limited to such a material. For example, the present disclosure can also be applied to a case in which a liquid-crystal material having a negative relative permittivity is used.

It is to be noted that the following implementations also pertain to the technological range of the present disclosure.

(1) A liquid-crystal lens including:
a plurality of first electrodes;
a second electrode placed to be opposed to the first electrodes; and
a liquid-crystal layer provided between the first electrodes and the second electrode,
in which the first electrodes each receiving a relatively low voltage applied thereto are provided more adjacently to each other than the first electrodes each receiving a relatively high voltage applied thereto.

(2) The liquid-crystal lens according to implementation (1), in which the widths of the first electrodes are non-uniform.

(3) The liquid-crystal lens according to implementation (1) or (2),
in which the liquid-crystal layer includes liquid-crystal molecules having refractive-index anisotropy, and
the orientations of the liquid-crystal molecules are changed by voltages applied through the first electrodes and the second electrode.

(4) The liquid-crystal lens according to any one of implementations (1) to (3), in which the liquid-crystal lens exhibits an effect of a lens having a lenticular-lens shape in a state of being applied with the voltages.

(5) A display apparatus including:
a display section configured to display an image; and
a liquid-crystal lens placed to be opposed to the display section and used to receive incident image light of the image to be displayed on the display section,
in which the liquid-crystal lens includes
a plurality of first electrodes,
a second electrode placed to be opposed to the first electrodes, and
a liquid-crystal layer provided between the first electrodes and the second electrode,
in which the first electrodes each receiving a relatively low voltage applied thereto are provided more adjacently to each other than the first electrodes each receiving a relatively high voltage applied thereto.

(6) The display apparatus according to implementation (5), in which the liquid-crystal lens exhibits an effect of a lens having a lenticular-lens shape in a state of being applied with the voltages between the first electrodes and the second electrode.

(7) The display apparatus according to implementation (6), in which the liquid-crystal lens does not exhibit the effect of the lens having the lenticular-lens shape and transmits the image light without refraction in a state of being applied with no voltages between the first electrodes and the second electrode.

(8) Electronic equipment having
a display apparatus including:
a display section configured to display an image; and
a liquid-crystal lens placed to be opposed to the display section and used to receive incident image light of the image to be displayed on the display section,
the liquid-crystal lens having
a plurality of first electrodes,
a second electrode placed to be opposed to the first electrodes, and
a liquid-crystal layer provided between the first electrodes and the second electrode,
in which the first electrodes each receiving a relatively low voltage applied thereto are provided more adjacently to each other than the first electrodes each receiving a relatively high voltage applied thereto.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid-crystal lens comprising:
a plurality of first electrodes;
a second electrode placed to be opposed to the first electrodes; and
a liquid-crystal layer provided between the first electrodes and the second electrode,
wherein the first electrodes each receiving a relatively low voltage applied thereto are provided more adjacently to each other than the first electrodes each receiving a relatively high voltage applied thereto, and
a lower voltage is applied to the first electrodes that are located closer to the center of the lens, and the first electrodes located at the center of the lens are provided with small electrode pitches.

2. The liquid-crystal lens according to claim 1, wherein the widths of the first electrodes are non-uniform.

3. The liquid-crystal lens according to claim 1,
wherein the liquid-crystal layer includes liquid-crystal molecules having refractive-index anisotropy, and
the orientations of the liquid-crystal molecules are changed by voltages applied through the first electrodes and the second electrode.

4. The liquid-crystal lens according to claim 1, wherein the liquid-crystal lens exhibits an effect of a lens having a lenticular-lens shape in a state of being applied with the voltages.

5. A display apparatus comprising:
a display section configured to display an image; and
a liquid-crystal lens placed to be opposed to the display section and used to receive incident image light of the image to be displayed on the display section,
wherein the liquid-crystal lens includes
a plurality of first electrodes,
a second electrode placed to be opposed to the first electrodes, and
a liquid-crystal layer provided between the first electrodes and the second electrode,
in which the first electrodes each receiving a relatively low voltage applied thereto are provided more adjacently to each other than the first electrodes each receiving a relatively high voltage applied thereto, and
wherein a lower voltage is applied to the first electrodes that are located closer to the center of the lens, and the first electrodes located at the center of the lens are provided with small electrode pitches.

6. The display apparatus according to claim 5, wherein the liquid-crystal lens exhibits an effect of a lens having a lenticular-lens shape in a state of being applied with the voltages between the first electrodes and the second electrode.

7. The display apparatus according to claim 6, wherein the liquid-crystal lens does not exhibit the effect of the lens having the lenticular-lens shape and transmits the image light without refraction in a state of being applied with no voltages between the first electrodes and the second electrode.

8. Electronic equipment comprising
a display apparatus including:
a display section configured to display an image; and
a liquid-crystal lens placed to be opposed to the display section and used to receive incident image light of the image to be displayed on the display section,
the liquid-crystal lens having
a plurality of first electrodes,
a second electrode placed to be opposed to the first electrodes, and
a liquid-crystal layer provided between the first electrodes and the second electrode,
in which the first electrodes each receiving a relatively low voltage applied thereto are provided more adjacently to each other than the first electrodes each receiving a relatively high voltage applied thereto, and
wherein a lower voltage is applied to the first electrodes that are located closer to the center of the lens, and the first electrodes located at the center of the lens are provided with small electrode pitches.

* * * * *